Figure 1:
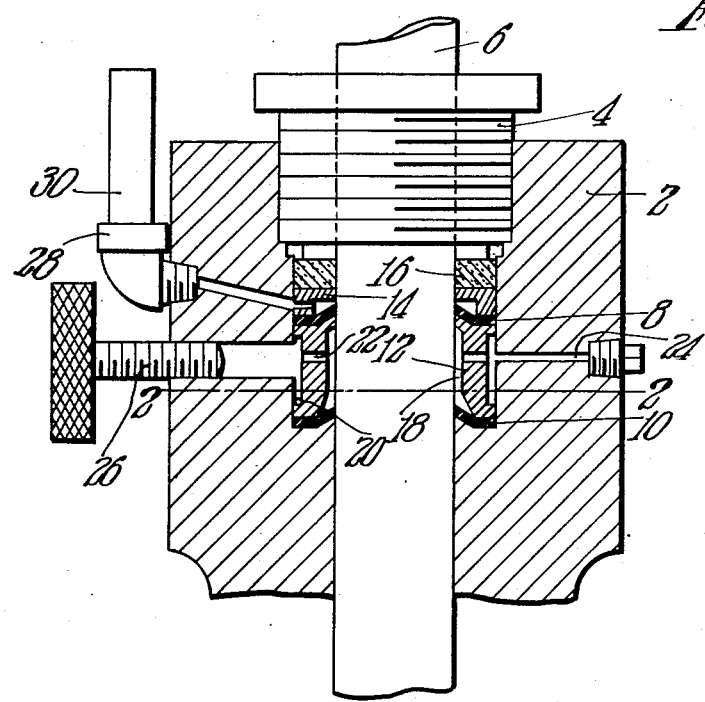

Jan. 3, 1950 V. T. MALCOLM 2,493,152
SEAL FOR SPINDLES OF VACUUM VALVES
Filed Dec. 23, 1946

INVENTOR.
Vincent T. Malcolm
BY
Walter C. Vom, Attorney.

Patented Jan. 3, 1950

2,493,152

UNITED STATES PATENT OFFICE 2,493,152

SEAL FOR SPINDLES OF VACUUM VALVES

Vincent T. Malcolm, Indian Orchard, Mass., assignor to The Chapman Valve Manufacturing Co., Indian Orchard, Mass., a corporation of Massachusetts Application December 23, 1946, Serial No. 717,853

2 Claims. (Cl. 286—27)

This invention relates to improvements in sealing means and is directed more particularly to sealing means for a movable member.

The principal objects of the invention are directed to novel sealing means which, although adapted for general use, is particularly adapted for use in connection with the stems or spindles of valves of all types.

In the ordinary form of valve, a stem or spindle is either reciprocable or rotatable for opening or closing the valve and according to this invention, a novel construction is provided to obviate leakage past the stem or spindle and will be found useful where conditions tend to cause leakage past the movable member or spindle.

Various novel objects and advantages of the invention will be hereinafter observed in the following description of the form of the invention at present preferred.

Figure 2:
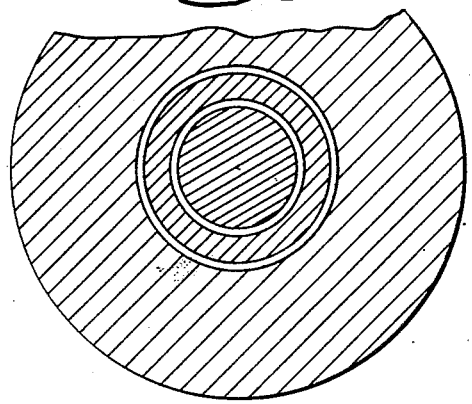

In the drawings:

Fig. 1 is a section elevational view showing the novel construction of the invention; and Fig. 2 is a sectional plan view on the line 2—2 of Fig. 1.

Referring now to the drawings more in detail, the invention will be fully described.

The upper or neck part of a valve is indicated by 2 which has a member 4 screw threaded in the upper part of a chamber or bore therein. A spindle is represented by 6 which according to the type of valve under consideration is either rotated or reciprocated to open or close the valve.

Upper and lower packings 8 and 10 are provided and a spool member or spacer 12 is disposed therebetween.

The parts are arranged so that the inner portions of the packings 8 and 10 are angularly disposed adjacent the spindle 6 and relative to the plane of their outer portions thereof, as shown.

A washer member 14 overlies the upper packing 8 and is formed so that the inner portion of the said packing 8 is not confined to any great extent, whereby it may flex.

The packings 8 and 10 are preferably yieldable, at least they are sufficiently yieldable to make intimate contact with the spindle and chamber when under compression. These members 8 and 10 may be made from rubber, rubber composition, neoprene or the like as may be desired.

An uppermost packing 16 is disposed on member 14 and this may be of fibrous material such as asbestos saturated with a viscous substance such as vacuum wax or the like.

The member 4 is screwed into the part 2 so that it presses on the member 16 which in turn acts on the member 14 to exert pressure on the parts therebelow so that the members 8 and 10 properly and intimately contact the spindle and wall of the chamber.

The member 12 has outer and inner recesses therearound cooperating with the spindle and wall of the chamber to provide annular spaces or grooves 18 and 20, which are closed at top and bottom.

One or more passageways such as 22 are provided in the wall of member 12 and a passageway 24 provided in the part 2 is closed by a screw plug, as shown.

A screw member 26 is provided which is in threaded engagement with a bore of part 2, as shown. A suitable sealing medium or viscous substance which may be vacuum wax is introduced into the bore so that said screw may be screwed into the part 2 to cause said substance to fill up the grooves 18 and 20 and cooperate with the members 8, 10, 12 and 16 to provide a tight seal for the spindle 6.

Other material than vacuum wax may be used depending upon the service for which the valve is to be used and the selection of the material will depend on conditions.

Where leakage past a movable part such as a spindle is objectionable, the construction will be found to be admirably adapted and in some cases it may be desirable to provide means for indicating whether the construction is leaking.

To that end a fitting 28 may be associated with the part 2 which carries an indicator or gauge 30 which is in communication through a passageway in the part 2 and an aperture in the member 14 with a space between the said member 14 and the spindle 6, all as shown.

By observing the liquid in the indicator, it will be possible to determine whether leakage past the spindle is occurring.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Sealing construction for a valve stem movable in a valve body having a bore around said stem which is open at its upper end and provided with a bottom wall comprising, a yieldable lower packing in said bore around said stem on said bottom wall, a rigid spacer around said spindle in said bore having a lower face on said lower packing and upper and lower peripheral portions engaging the sides of said bore and an intermediate peripheral portion spaced from said sides of the bore providing an outer annular space, an inner portion of said spacer downwardly from the upper end thereof being spaced from the stem providing an inner annular space and said spacer provided with a transverse passageway connecting said spaces, a yieldable packing filling said bore and around said stem above said spacer, a rigid washer filling said bore and around said stem above said upper yieldable packing, an uppermost yieldable washer filling said bore and around said stem above said rigid washer, and a pressure member around said stem above the uppermost washer extending into and in threaded engagement with the upper open end of said bore adapted to exert a downward pressure on said uppermost washer, said body provided with a passageway for a sealing medium connected at its inner end to said outer space, and a screw member in threaded engagement with an outer end of said passageway for acting on sealing medium therein.

2. Sealing construction for a valve stem movable in a valve body having a bore around said stem which is open at its upper end and provided with a bottom wall comprising, a yieldable lower packing in said bore around said stem on said bottom wall, a rigid spacer around said spindle in said bore having a lower face on said lower packing and upper and lower peripheral portions engaging the sides of said bore and an intermediate peripheral portion spaced from said sides of the bore providing an outer annular space, an inner portion of said spacer downwardly from the upper end thereof being spaced from the stem providing an inner annular space and said spacer provided with a transverse passageway connecting said spaces, a yieldable packing filling said bore and around said stem above said spacer, a rigid washer filling said bore and around said stem above said upper yieldable packing, an uppermost yieldable washer filling said bore and around said stem above said rigid washer, and a pressure member around said stem above the uppermost washer extending into and in threaded engagement with the upper open end of said bore adapted to exert a downward pressure on said uppermost washer, said body provided with a passageway for a sealing medium connected at its inner end to said outer space, and a screw member in threaded engagement with an outer end of said passageway for acting on sealing medium therein, inner portions of the bottom wall of the bore and an inner portion of the upper face of the spacer inclining upwardly whereby the lower and upper yieldable packings at inner portions thereof incline upwardly adjacent said stem, and said rigid washer having a lower central portion spaced from the inclined portion of the upper yieldable packing.

VINCENT T. MALCOLM.

REFERENCES CITED

The following references are of record in the file of this patent:

UNITED STATES PATENTS

| Number | Name | Date |
| --- | --- | --- |
| 390,225 | Guels | Oct. 2, 1888 |
| 1,010,498 | Hultgren | Dec. 5, 1911 |
| 1,032,187 | Clifford | July 9, 1912 |
| 1,720,346 | Pew | July 9, 1929 |
| 1,861,132 | Parsons | May 31, 1932 |
| 2,091,671 | Campbell et al. | Aug. 31, 1937 |
| 2,442,622 | Starr | June 1, 1948 |

OTHER REFERENCES

"Steel" Magazine, July 31, 1939.